Aug. 4, 1959 E. H. KENDALL 2,897,990
TONGS
Filed May 24, 1957 3 Sheets-Sheet 1
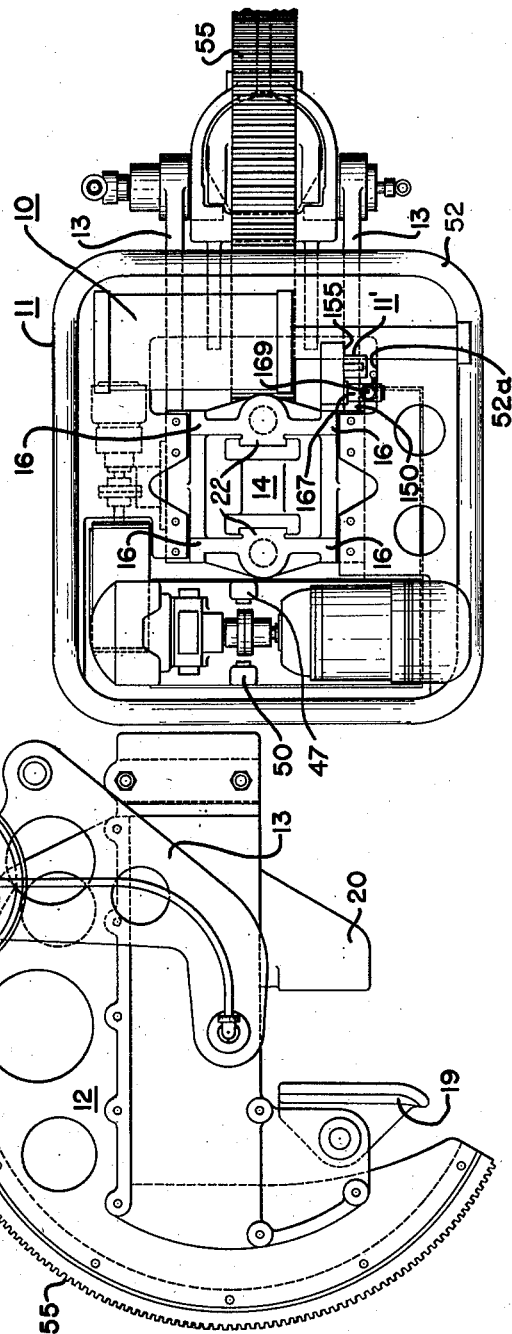
INVENTOR
EDGAR HOMER KENDALL Aug. 4, 1959     E. H. KENDALL     2,897,990
TONGS
Filed May 24, 1957     3 Sheets-Sheet 2
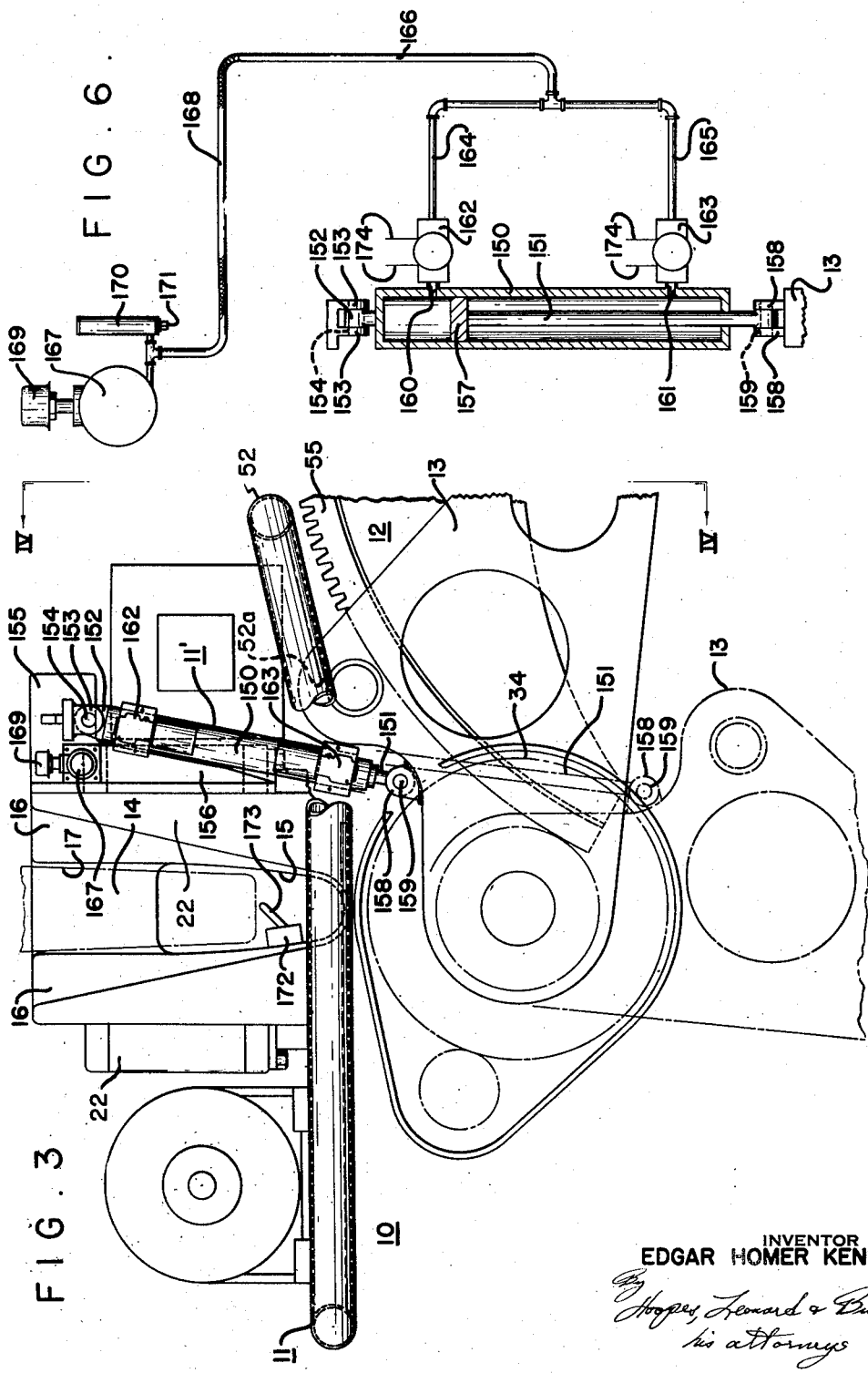
INVENTOR
EDGAR HOMER KENDALL Aug. 4, 1959     E. H. KENDALL     2,897,990
TONGS
Filed May 24, 1957     3 Sheets-Sheet 3
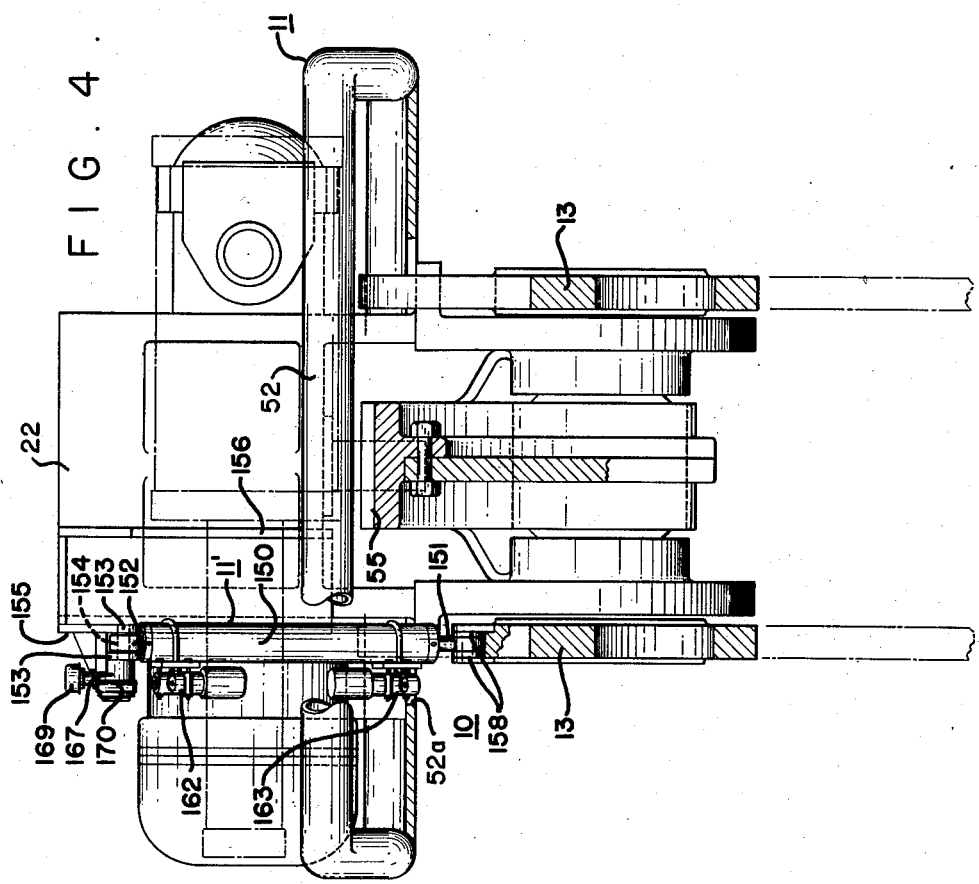
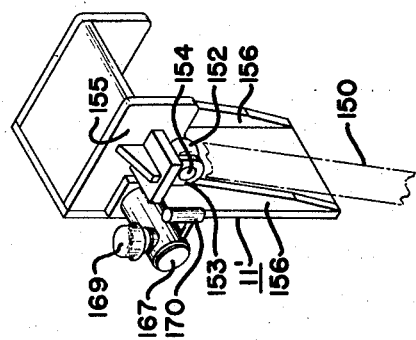
INVENTOR
EDGAR HOMER KENDALL

United States Patent Office 2,897,990
Patented Aug. 4, 1959

2,897,990

TONGS

Edgar Homer Kendall, Alliance, Ohio, assignor to Heppenstall Company, Pittsburgh, Pa., a corporation of Pennsylvania Application May 24, 1957, Serial No. 661,384

6 Claims. (Cl. 214—658)

This invention relates to tongs, preferably remotely controllable, for gripping work objects and, further, for changing the position and space thereof as and when desired. More particularly, this invention pertains to upender tongs for the secure handling of coils or other objects in the metal or other industries. It provides supplemental structure when desired for tongs of the kind shown in the applicant's prior application Serial No. 578,470, filed April 16, 1956, now Patent No. 2,821,318.

In the handling of a supported tongs, of the kind shown in the aforesaid application Serial No. 578,470, suspended from a crane, truck, or other materials handling equipment, it is often desirable to square the position of the tongs before, or after, its engagement with a work object. In that way any tendency to act as a pendulum is inhibited and likelihood of damage either to the work object or to the tongs itself is minimized. In the case of a coil of metal strip, for example, the eye of the coil is usually either horizontal or vertical and a respective horizontal or vertical squaring of the tongs to pick up or deposit that coil is correspondingly preferred, irrespective of any change of the work object from one position thereof to the other while the work object is being carried in space by the tongs.

Further, the handling space for a tongs of my aforesaid application may be so limited or the nearness of the plant floor may result in a resting of the bottom of the tongs against a solid object in the course of the picking up or deposit of a coil. In these situations an operator of the equipment from which the tongs is suspended may hold the tongs under sufficient suspension so that the coil will be picked up or released, as the case may be, while the control head remains generally vertically above the body of the tongs. On the other hand, if such tongs more fully rests on or against such a solid object, the control head may tip to one side even though the drive pinion and driven gear are locked relative to that head, because the rack pinion will be in a rollable somewhat planetary engagement relation with the arcuate rack by virtue of the spaced connector links having pivot axes coinciding respectively with the axes of said rack pinion and arcuate rack. I prevent the possibility of such tipping by means of the improvement set forth in this invention and thereby increase the field of application for my new kind of upender tongs.

Other objects and advantages will be apparent from the following description and from the accompanying drawings, which are illustrative of one embodiment only, in which Figure 1 is a view in front elevation of one embodiment of an upender tongs incorporating this invention and shown gripping a coil in vertical position;

Figure 2 is a plan view of the tongs embodiment shown in Figure 1 after it has been rotated to place such coil in a horizontal position;

Figure 3 is a somewhat enlarged view in front elevation of the upper part of such tongs when in the position shown in Figure 2;

Figure 4 is a side view of the portion shown in Figure 3 looking in the direction of line IV—IV of Figure 3;

Figure 5 is a perspective view generally from the side shown in Figure 4 of the mounting of the hold cylinder and its reservoir in the illustrated embodiment; and Figure 6 is a schematic view of a hydraulic circuit utilizable for the hold cylinder shown in the illustrated embodiment.

The construction and operation of the embodiment of an upender tongs 10 illustrated in the drawings hereof is set forth in my aforesaid patent application Serial No. 578,470 with the provision herein of hold cylinder means 11'. Means 11' is adapted automatically to inhibit tipping or swinging of control head 11 or body 12 whenever the tongs 10 is set down upon a relatively solid support by a crane hook or other equipment normally used to suspend tongs 10 in the course of its operations. Accordingly, reference is hereby made to the applicant's aforesaid application Serial No. 578,470, for a more detailed description of the construction and operation of tongs 10 (other than the construction and operation of the means 11' disclosed herein), the same reference numerals having been given to the structure shown in the drawings hereof as in the aforesaid application to indicate such applicable correspondence in construction and functioning.

Holding cylinder means 11', as illustrated comprises a cylinder 150 and piston rod 151 respectively pivotally connected to control head 11 and a connector link 13. Cylinder 150 is provided with an upstanding lug 152 which fits between the sides of a clevis 153 so that a pivot pin 154 may pass through registering openings in the clevis sides and lug to pivotally support the cylinder 150. Clevis 153 in turn is welded to the top member 155 of an inverted L-shaped bracket having a vertical leg 156 which is welded to a standard 22 in the frame of head 11 as shown. Portion 52 of the frame of head 11 is provided with an opening 52a through which the cylinder 150 may extend and move angularly in the course of the operation of tongs 10. Piston rod 151 in turn is affixed to a piston 157 in cylinder 150, an appropriate stuffing box being provided at the rod end of cylinder 150 to seal the opening through which rod 151 extends. The lower end of rod 151 is positioned between a pair of spaced ears 158 forming a bottom clevis, such ears being welded to the adjacent connector link 13 of the spaced pair thereof. A pivot pin 159 extends through registering openings in the clevis 158 and the bottom end of rod 151 to provide a "hold" cylinder connection between control head 11 and the links 13, thereby fixing the relative position of head 11 to the remainder of tongs 10 whenever piston 157 is hydraulically locked in a selected longitudinal position in cylinder 150 which will usually be caused to occur at one or the other end of the piston travel when the tongs is in a horizontal or vertical position respectively.

Cylinder 150 is provided with ports 160 and 161 respectively at the head and rod ends thereof, which ports in turn are controlled as to the flow of fluid therethrough by the respective solenoid actuated valves 162 and 163. Valves 162 and 163 are normally open when tongs 10 is suspended from a crane hook 17 or other lifting device therefor. Hence, operations of tongs 10 while it is so suspended are carried on in normal fashion as more particularly described in my aforesaid patent application Serial No. 578,470 in terms of grip tightening or loosening by the cooperating jaws 19 and 20 and in terms of the rotation of body 12 in space by the driving of arcuate rack 55 in the appropriate direction to the desired angular extent. In such operations of tongs 10 while it is substantially so suspended or supported by a crane hook 17 or the like, the rotation of the links 13 about their upper pivotal axis coincident with the axis of the driven gear 34 takes place without any hindrance from the holding means 11' since piston 157 will simply be moved the appropriate distance in cylinder 150 as needed between the "horizontal" position extreme when piston 157 is fully retracted as shown in full lines in Figure 3 to the "vertical" position extreme when piston 157 and thereby rod 151 is in its fully extended position as shown in dot-and-dash lines in the aforesaid Figure 3.

Hydraulic liquid within cylinder 150 will flow as needed through the open valves 162 and 163 during such operations of tongs 10 when it is so suspended. Such flow takes place through respective pipes 164 and 165, a common pipe 166 being connected to a hydraulic liquid reservoir 167 to keep the cylinder 150 full of hydraulic liquid at all times. A portion 168 of pipe 166 is flexible in view of the angular movement of cylinder 150 about pivot pins 154 and 159 in the course of the swinging of links 13 when cylinder 150 is not hydraulically locked. Reservoir 167 is mounted on plate 155 and provided with a breather filter filler cap 169, a sight glass 170 and a drain cock 171.

Automatic operation of holding cylinder means 11' is obtainable to prevent any unwanted tipping or swinging of control head 11 relative to arcuate rack 55 and to maintain body 12 and thereby tongs 10 in a selected angular position to pick up or deposit a coil or other work object when crane hook 17 is lowered out of supporting relation to bar 14. Thus a limit switch 172 may be fastened to shackle 16 and provided with a trip arm 173 which extends into eye 15 such that when crane hook 17 moves down sufficiently far relative to bar 14, it will trip arm 173 and energize both valves 162 and 163 through the current carrying wires 174 to close such valves and the ports 160 and 161. Such closure of the valves 162 and 163 will hydraulically lock piston 157 in the hold cylinder 150 with the selected distance existing between the pivots 154 and 159. Such locked condition of the hold cylinder means 11' does not interfere with any operation of the gripper jaws 19 and 20 whenever the gripper jaws valve 50 therefor is actuated. Further, after the jaws 19 and 20 have been operated either to pick up or deposit a coil as desired, re-engagement of bar 14 by crane hook 17 in a resumption of its supporting role for tongs 10 will move crane hook 17 out of engagement with arm 173 allowing arm 173 to return to its normal position and thereby automatically open the valves 162 and 163, which may be spring biased for that effect, by the de-energization of the respective solenoids in those valves. Since hook 17 may be taken entirely out of eye 15 in which case it would not bear against arm 173, an auxiliary circuit is provided through flexible cables between the solenoids of valves 162 and 163 and the cab of the crane so that the person operating it can independently energize such solenoids whenever the slacked hook 17 is to be removed from eye 15. Or, provision may be made for an entire manual remote control of valves 162 and 163, in which event limit switch 172 would not be required, by having the flexible conductors 174 extend to the cab or control panel of the crane or other lifting equipment for the tongs, so that the person operating the same would wholly control the locking and unlocking operation of valves 162 and 163.

Moreover, the following alternate "reverse" arrangement may be utilized for the control of the locking and unlocking of hold cylinder 150. Thus, a switch might be utilized in the position of switch 172 and arranged with a longer switch arm so that whenever any hook like hook 17 was in eye 15, whether or not the hook is slack, it would bear against such arm and close the circuit connection through such first-named switch; and the solenoid operated hold cylinder valves for ports 160 and 161 would be spring biased to normally closed position, thereby requiring energization of their respective solenoids in series with such first-named switch to open them so long as a hook remained in the eye 15 to keep the first-named switch closed. Such solenoids further may be connected in parallel with the branch circuits to the respective solenoids for the positioning valve 47 with the result that upon any operation of that positioning valve to move the arcuate rack 55 in either direction would energize both hold cylinder solenoids and unlock (a hook being in the eye) the hold cylinder 150 for the duration only of such movement of arcuate rack 55. Upon cessation of such rack movement, the spring biases of the hold cylinder valves would automatically resume control and lock piston 157 in its selected position in the cylinder 150 to maintain the desired spatial relation between head 11 and body 12.

Other embodiments of this invention may be made and various modifications may be provided for the embodiment shown and details thereof without departing from the spirit of my invention or the scope of the appended claims.

I claim:

1. In a tongs, apparatus comprising, in combination, a control head, a connector unit swingably supported by and depending from said head, an arcuate body supported by and centrally connected to said unit for rotation generally about a horizontal axis, rotational means respectively on said head and body in engagement at all times, pressure fluid means on said head to actuate said first-named means and rotate said body in a corresponding direction between its arcuate ends, opposed gripping means mounted on said body and relatively movable in the plane of said body, means on said head in pressure fluid communication with said gripping means through articulated members to actuate said gripping means substantially independently of said rotational means, extensible means respectively pivotally connected between said head and unit, means to cause said extensible means to change length to follow changes in the relative positions of said head and unit, and automatic means to lock said extensible means at a selected position to fix the distance between said head and unit.

2. In a tongs, apparatus comprising, in combination, a control head, an arcuate body depending from said head and swingably supported relative thereto for rotation of said body generally about a horizontal axis, pressure fluid means on said head to effect and control the rotation of said body in a selected direction, independently operable pressure fluid means for opposed gripping jaws mounted on said body and relatively movable in the plane of said body, extensible means respectively pivotally connected to said head and body to follow operative changes in the relative positions of said head and body caused by the activation of said first-named pressure fluid means, and means to secure said extensible means at a position determined by the operation of said first-named pressure fluid means to fix the distance between said head and body.

3. In a tongs, apparatus comprising, in combination, a lifting and control head, gear drive means connected to said head, a connector unit movably supported by and dependent from said head, an arcuate gear body rotatably and centrally mounted in said unit about a generally horizontal axis, said gear body being in geared engagement with said first-named means, opposed relatively movable gripping jaw means secured to said gear body, selective means extending between said head and said gear body to operate said last-named means independently of the operation of said first-named means, extensible cylinder and piston rod means respectively pivotally connected to said head and to said unit to follow operative changes in the relative positions of said head and unit caused by the operation of said gear drive means, and still further independent means for locking said extensible means at a selected position to fix the distance between said head and said unit determined by the operation of said gear drive means.

4. In a tongs, apparatus comprising, in combination, a control head adapted to be operatively engaged by a lifting member, gear drive means connected to said head, a connector unit movably supported by and dependent from said head, an arcuate gear body rotatably and centrally mounted in said unit about a generally horizontal axis, said gear body being in geared engagement with said first-named means, opposed relatively movable gripping jaw means secured to said gear body, selective means extending between said head and said gear body to operate said last-named means independently of the operation of said first-named means, variable length hydraulic cylinder means respectively pivotally connected to said head and to said unit, and means for locking said last-named means at that length thereof existing upon cessation of movement of said arcuate gear body.

5. In a tongs, apparatus comprising, in combination, a lifting and control head adapted to be lifted by a lifting member, a remotely controllable hydraulic liquid pump, a hydraulic liquid reservoir connected to said head from which said pump takes suction, a driven shaft rotatably mounted on said head, a reversible fluid drive motor mounted on said head to drive said driven shaft in a corresponding direction when said drive motor is actuated, valve means connecting said pump and said drive motor to regulate the direction of actuation of the latter, a connector unit swingably supported from said head, a work object grip and rotation body rotatably mounted in said unit about a horizontal axis, relatively movable opposed jaws mounted on said body and movable in the plane of said body at right angles to said axis, gear means extending between said head and said body for actuation by said drive motor to correspondingly rotate said body, interconnected hydraulic means mounted on said head and said body to selectively open and close said jaws and pivotal at the axes of said connector unit and body respectively, valve means to regulate independently said actuation by said drive motor and said opening and closing of said jaws, a hydraulic hold cylinder mechanism pivotally connected between said head and said connector unit, a piston in said cylinder, means normally open to the flow of hydraulic fluid therethrough during the suspension of said tongs by means of said lifting member to permit the flow of hydraulic fluid respectively relative to the opposite sides of said piston, an elevated further reservoir to maintain said cylinder full of hydraulic liquid on both sides of said piston, a limit switch connected to said head and automatically operable upon release of said head by said lifting member, and means connecting said limit switch to said immediately prior-named means to stop the flow of hydraulic fluid relative to said hydraulic hold cylinder mechanism upon the operation of said switch.

6. In a tongs, apparatus comprising, in combination, a lifting and control head adapted to be lifted by a lifting member, a remotely controllable hydraulic liquid pump, a hydraulic liquid reservoir connected to said head from which said pump takes suction, a driven shaft rotatably mounted on said head, a reversible fluid drive motor mounted on said head to drive said driven shaft in a corresponding direction when said drive motor is actuated, a connector unit swingably supported from said head, a work object grip and rotation body rotatably mounted in said unit about a horizontal axis, relatively movable opposed jaws mounted on said body and movable in the plane of said body at right angles to said axis, gear means extending between said head and said body for actuation by said drive motor to correspondingly rotate said body, interconnected hydraulic means mounted on said head and said body to selectively open and close said jaws and pivotal at the axes of said connector unit and body respectively, a hydraulic hold cylinder mechanism pivotally connected between said head and said connector unit, a piston in said cylinder, means normally open to the flow of hydraulic fluid therethrough during the suspension of said tongs by means of said lifting member to permit the flow of hydraulic fluid respectively relative to the opposite sides of said piston, a further reservoir to maintain said cylinder full of hydraulic liquid on both sides of said piston, and circuit means adapted to shut off said last-named flow of hydraulic fluid at a predetermined position to fix the distance and relative position between said head, connector unit and body.

References Cited in the file of this patent
UNITED STATES PATENTS

| 2,596,895 | Frischmann | May 13, 1952 |
| 2,630,931 | Douglas | Mar. 10, 1953 |
| 2,736,600 | Carlson | Feb. 28, 1956 |
| 2,747,550 | Cosgrove | May 29, 1956 |
| 2,770,380 | Anderson | Nov. 13, 1956 |

FOREIGN PATENTS

| 31,954 | Germany | May 24, 1956 |